W. T. BEEKMAN.
Car-Starters.

No. 149,427.  Patented April 7, 1874.

Witnesses:  Inventor:

UNITED STATES PATENT OFFICE.

WILLIAM T. BEEKMAN, OF PETERSBURG, ILLINOIS.

IMPROVEMENT IN CAR-STARTERS.

Specification forming part of Letters Patent No. 149,427, dated April 7, 1874; application filed December 18, 1873.

*To all whom it may concern:*

Be it known that I, WILLIAM T. BEEKMAN, of Petersburg, in the county of Menard and State of Illinois, have invented a new and Improved Combined Car Starter and Brake; and I do hereby declare that the following is a full, clear, and exact description of the same, reference being had to the accompanying drawing forming a part of this specification, in which—

Figure 1:
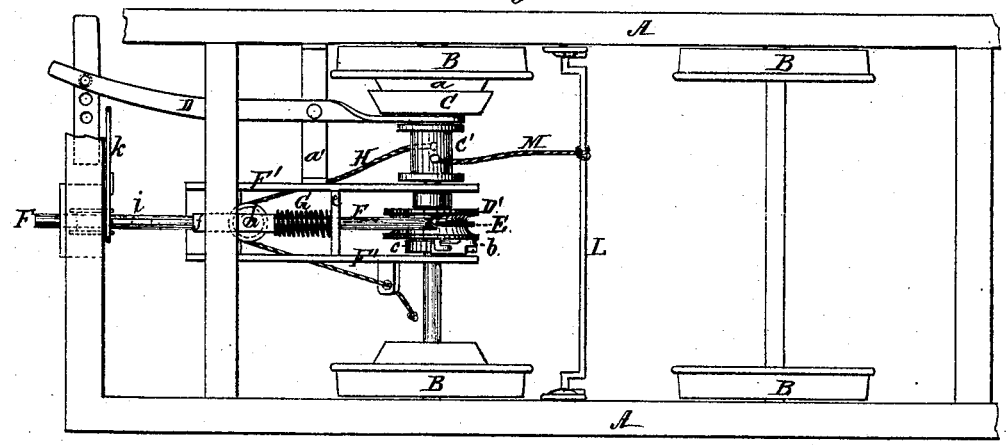
Figure 2:
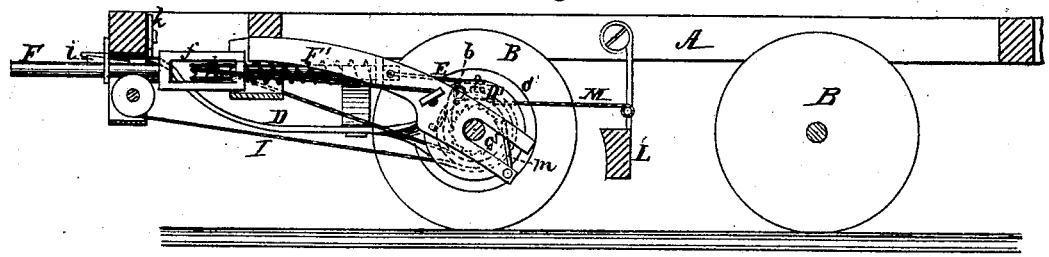

Figure 1 is a plan of a car-truck with my improved brake and starting mechanism applied. Fig. 2 is a sectional elevation.

My invention, which is designed more especially for application to street-cars, has for its object to utilize the force expended in braking the cars for the purpose of storing power to be subsequently used in aiding propulsion. To this end I employ a friction-clutch, a chain-pulley and ratchet mechanism, and a spring, these elements or devices being so combined and applied to the axle, wheel, and draft-bar that whenever the brake mechanism is brought into action the spring will be compressed correspondingly to the force thus expended, or necessary to overcome the momentum of the car and reduce its speed, or bring it to rest, the power thus stored being immediately or remotely available in starting or propelling the car, all as hereinafter more fully set forth.

In the drawing, the frame or platform A of a car is shown mounted upon wheels B, of the ordinary pattern. The hollow cone or clutch C is mounted loose on the axle, and thrown into and out of gear with the circular boss or projecting hub *a* of the adjacent wheel B by means of a forked lever, D, which is pivoted, near its inner end, to a cross-bar, *a'*, and extends forward to or beyond the end of the frame A, to adapt it for connection with a lever or other suitable device for operating it, which is accessible to, and under the control of, the driver. I do not design to restrict myself to any particular device for this purpose, since the ordinary standard and hand-wheel, or other means, may be advantageously employed. A cylindrical sleeve or drum, C', is rigidly connected to the clutch C, so that both form practically one device, and rotate or slide together upon the axle. The loose pulley D' is mounted on the axle centrally thereof, and is adapted for rigid connection therewith by a spring-pawl, *b*, which engages a ratchet-wheel, *c*, that is fast on the axle. A rope or chain, E, is secured to the grooved periphery of said pulley at one end, and to the draft-bar F at the other end. The draft-bar slides in suitable supports at its front end, and through a cross-bar, *e*, of frame F', at its rear end. The latter is suitably arranged between the axle and front of the car-frame, and supported by each. The draft-bar is encircled by a powerful spiral spring, G, one or more, which, when the chain E is wound upon the pulley D', is, or are, compressed between the aforesaid cross-bar *e* and the enlargement *f* of the draft-bar. In Fig. 1 the spring is shown compressed, and the gravity-catch lowered to hold the draft-bar in the retracted position. Alternative of this, I may apply spiral springs to the forward ends of the bars composing frame F', they being reduced or made cylindrical for the purpose, and arrange a cross-bar to slide on said bars, so that when pushed back by the draft-bar it will compress the springs, and the same result be effected as in the above-described arrangement. A small pulley is pivoted horizontally in a slot of said enlargement *f*, and the chain or rope H, which passes around it, has its respective ends secured to the sleeve or drum C', and to a lug or projection on the opposite side of the frame F'.

Instead of attaching the rope to the frame F' it may be connected with another drum and clutch placed on the adjacent portion of the axle, and thus both ends of the rope would be wound up simultaneously, the lever D being, in such case, connected with both clutches. Another cord or chain, I, is connected with the enlargement of the draft-bar and with the pulley D', passing intermediately over a pulley, *h*, pivoted in bearings attached to the under side of the front cross-bar of the car-frame. Its function is to cause the pulley D' to rotate backward and take up the slack of the draft-chain E when the draft-bar is drawn or pushed back. A spiral or other suitably-arranged spring might, obviously, be employed for the same purpose; or the pulley D' might be loaded or weighted on one side to produce the result.

There is a lug, *i*, on the draft-bar, with which a catch-bar, K, may be caused to engage when the draft-bar is drawn back, thereby preventing the spring (or springs) G from immediately expending its (or their) force, or until such time as desired, say, when extra speed is requisite, or the car reaches an elevation or obstacle that requires extra exertion of the team to surmount. This catch-bar is shown pivoted to the front cross-bar of the car-frame, and will, in practice, be accessible to the driver, so that he may conveniently operate it. A finger, $m$, lifts the spring-pawl off from the ratchet-wheel $c$ when the pulley $D'$ is rotated backward to the farthest extent allowed by the spring G, and thus, when the catch-bar K locks the draft-bar in the retracted position, the car may be run backward without interference from the mechanism above described.

The ordinary pendent brake-beam L may be auxiliarly employed in connection with the friction-clutch mechanism by connecting it to the sleeve $C'$ through the medium of a chain, M, as shown, so that when the chain is wound on it in one direction the chain M will be wound on it in the opposite direction, thereby applying the brake-shoes to the wheels.

When it is desired to apply the brake, the lever D is shifted laterally to cause the friction-clutch to engage with the conical wheel-hub $a$, which causes it to revolve together with the sleeve or drum $C'$ in the same direction as the axle. This winds the rope or chain H around the pulley $C'$, and forces the draft-bar backward, thereby compressing spring G to the same extent. Simultaneously with this movement of the draft-bar, the chain E is wound on the pulley $D'$ by the same rotating backward through the traction of the rope or chain I. When the draft-bar has been drawn back sufficiently far, the catch-bar K may be caused to hold it in that position, and the friction-disk released. Thus the power of the spring will be held reserved until such time as it is needed. The greater the radius of the pulley D the greater will be the leverage, but the clutch $C'$ will need to be held against the wheel-hub with corresponding force. If the pulley has a diameter one-half that of the wheels B the force necessary to start the car will be one-half what it would if the pulley were of the same diameter as the wheels. Thus, to double the power, the radius of the pulley must be doubled.

The mechanism effects the eminently desirable result of storing all the force, minus friction, expended in braking the car, and rendering it available in starting or propelling the car at any desired time. The momentum of the car, other things equal, will always determine the amount of force expended and stored in the one case, and reapplied and expended in the other.

The slightly-added weight and cost of a car provided with this apparatus over the ordinary brake mechanism are insignificant in comparison with its value in saving and utilizing power, conducing thereby to economy of the strength and endurance of the draft-animals, and increased rapidity of locomotion.

What I claim is—

1. The combination, with the wheel and axle of a rail-car, of a friction-clutch, drum $C'$, chain or rope H, chain I, spring G, sliding draft-bar F, loose chain-pulley $D'$, and ratchet mechanism described, to operate as specified, for storing and reapplying part of the force expended in braking the car, as set forth.

2. The combination, with the wheel and axle and sliding draft-bar, of a sliding clutch and drum, C $C'$, a spring, G, chain H, loose pulley $D'$, and ratchet mechanism described, as and for the purpose set forth.

The above specification of my invention signed by me this 12th day of December, 1873.

WILLIAM T. BEEKMAN.

Witnesses:
SOLON C. KEMON,
CHAS A. PETTIT.